United States Patent [19]
Fletcher et al.

[11] 3,795,448
[45] Mar. 5, 1974

[54] DOPPLER SHIFT SYSTEM

[76] Inventors: James C. Fletcher, Administrator of the National Aeronautics and Space Administration with respect to an Invention of; Sol Aisenberg, 36 Bradford Rd., Natick, Mass. 01760

[22] Filed: June 28, 1972

[21] Appl. No.: 266,943

[52] U.S. Cl.............. 356/28, 356/106 R, 356/112
[51] Int. Cl. ............................................ G01p 3/36
[58] Field of Search .... 356/28, 106 R, 106 LR, 112

[56] References Cited
UNITED STATES PATENTS

| | | | |
|---|---|---|---|
| 3,679,313 | 7/1972 | Rosenberg | 356/112 |
| 3,552,855 | 1/1971 | Crosswy et al. | 356/28 |
| 3,431,514 | 3/1969 | Oshman et al. | 250/199 |
| 3,635,562 | 1/1972 | Catherin | 356/112 |
| 3,469,923 | 9/1969 | Mertz | 356/106 R |

OTHER PUBLICATIONS
Huffaker, "Applied Optics," Vol. 9 No. 5, 5–1970, PP. 1026–1039.

*Primary Examiner*—Maynard R. Wilbur
*Assistant Examiner*—S. C. Buczinski
*Attorney, Agent, or Firm*—Monte F. Mott; Paul F. McCaul; John R. Manning

[57] ABSTRACT

A system for measuring velocities of radiating particles based on doppler shift is disclosed. Light from the particles is directed through a narrow band optical filter to a Fabry-Perot interferometer initially tuned to a selected center line corresponding to zero particle doppler shift. The movable mirror of the interferometer is made to sweep about the center line by the output of a modulation oscillator. The fringe pattern output is imaged onto a pin hole through which light is directed to a photomultiplier. The output of the photomultiplier is supplied to a phase sensitive detector which is supplied with the oscillator output as a reference signal and which operates in the quadrature mode. The detector's output is gain controlled and is combined with the oscillator's output to adjust the interferometer's movable mirror to acquire the line center.

6 Claims, 2 Drawing Figures

DOPPLER SHIFT SYSTEM

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention:

The present invention is directed generally to a velocity measuring system and, more particularly, to a system for measuring the velocities of radiating particles based on Doppler shift.

2. Description of the Prior Art:

In various scientific and practical appreciation it is often important to determine the velocities of radiating particles, such as ions or atoms, in a flowing plasma. As is known the velocity of such particles causes a wavelength shift known as the Doppler shift. For velocities of interest in plasma, for example in the range of $10^6$ centimeters per second (cpm), the anticipated Doppler shift is about 0.2Å. Since the wavelengths of interest are usually in the range of 4,000 to 7,000Å it is seen that very small relative wavelength changes must be measured. In addition, if one wishes to measure the velocity change to several percent the system resolution must be one of about 0.002Å.

None of the prior art wavelength measuring systems has such a resolution. Therefore, herebefore, the principle of Doppler shift was not employed to determine the small changes in velocities of radiating particles in a plasma even though their knowledge is often of great importance.

OBJECTS AND SUMMARY OF THE INVENTION

It is a primary object of the present invention to provide a new system for determining wavelength shifts to a high degree of resolution.

Another object of the present invention is to provide a new system for determining changes in velocities of radiating particles in a plasma.

A further object of the present invention is to provide a new system for determining velocity changes of radiating particles in a plasma or the like based on Doppler shift.

Still a further object of the present invention is to provide a new method for determining Doppler shift of radiating particles.

These and other objects of the invention are achieved in a system in which light, leaving the plasma in different directions, is collected by several light pipes. The pipes are oriented so that they can collect light leaving the plasma in different directions relative to the plasma velocity. At any one time light from one of the pipes is passed to an interferometer, such as Fabry-Perot interferometer, through a narrow band optical filter which essentially selects the line of interest to be measured. The concentric ring fringe pattern output of the interferometer is imaged onto a pin hole, behind which is located a very sensitive light detector. The detector converts the transmitted light signal into an electrical signal, which is a measure of the wavelength change. To prevent the system from being sensitive to light amplitude changes the system includes an oscillator which sweeps the interferometer periodically around the spectral line so that the resulting measurements can be used to separate changes of signal output due to wavelength changes from signal changes due to light amplitude changes. The system may further include a feedback stabilization loop which includes a phase detector whose output is fed back to permit the interferometer to be locked into resonance with the spectral line. In this way, the system is converted into a wavelength discriminator which is relatively independent of amplitude modulation.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
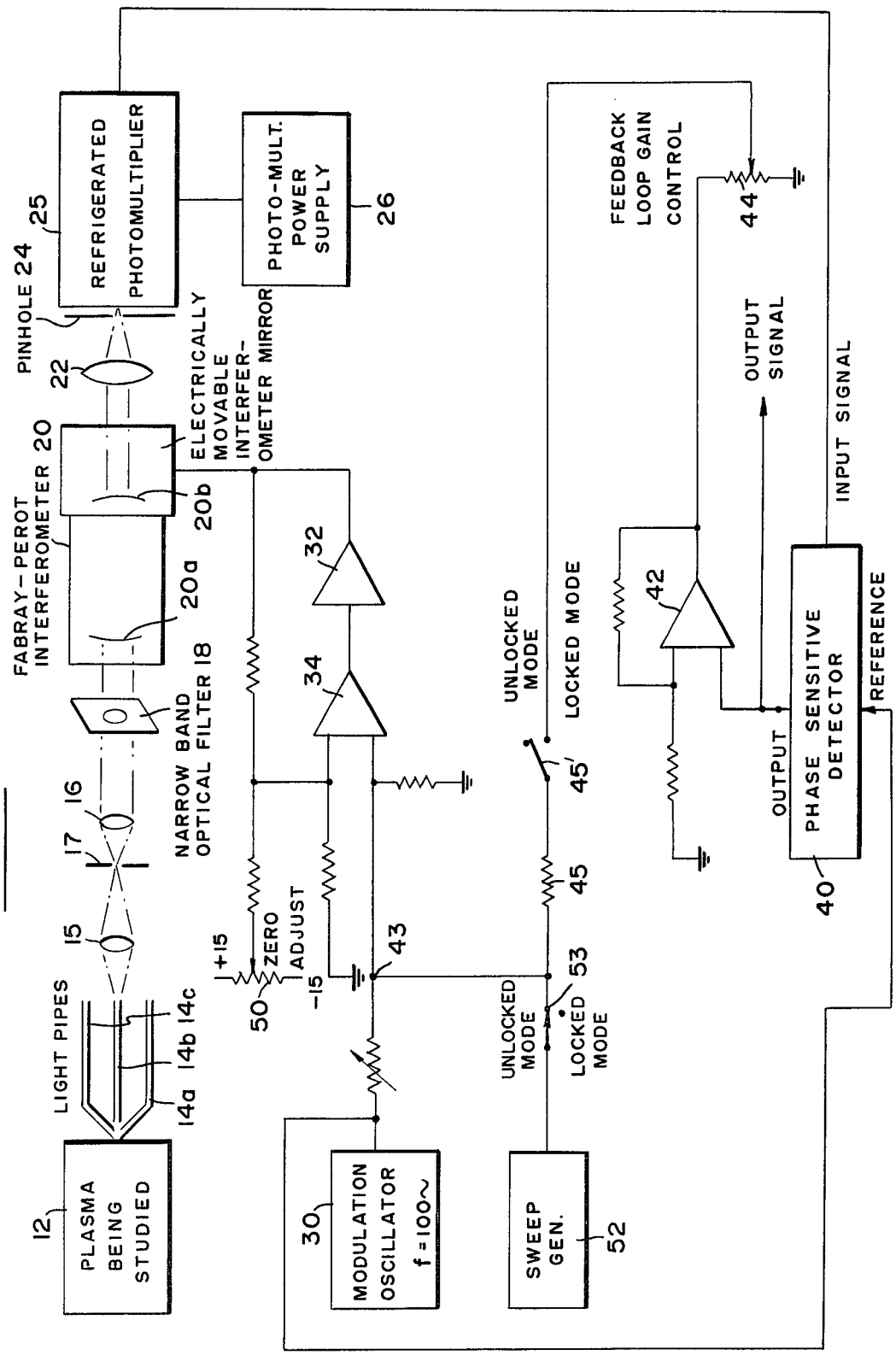
FIG. 1 is a block diagram of the present invention.

Attention is first directed to FIG. 1 wherein numeral 12 designates the plasma being studied. Light from the plasma is collected by one of a number of light pipes. Three pipes are shown for explanatory purposes and are designated by 14a, 14b and 14c. The pipes, which in practice may be implemented by fiber optics, are oriented so that they can collect light leaving the plasma in different directions relative to the plasma velocity. The central light pipe 14b for example, collects light in a direction at right angles to the plasma velocity so that there is no Doppler effect contributing to a Doppler shift. This permits the measurement of the location of the center of the line for comparison with the Doppler shifted line. Another light pipe is able to collect light from plasma moving with a velocity component towards it, while another light pipe measures light with the velocity component away from the direction of light propagation. The component of the velocity in the direction of the light collecting structure determines the sign of the Doppler shift. For light with the velocity component in the direction of the light collector the frequency is increased so that the wavelength shifts towards shorter wavelengths.

The light collected from the appropriate light pipe or fiber optics is then further processed by lenses 15 and 16 and stop 17 and is projected through a narrow band optical filter or spectrometer 18. This optical filter essentially selects the line of interest to be measured. The wavelength of the line being studied is selected to be characteristic of a particular radiating atom or of a particular radiating ion. Usually an intense line, relatively isolated from other lines, is selected. The light coming out of the narrow band filter essentially has the spurious lines significantly reduced while the line under consideration is only moderately reduced.

The output of the narrow band filter 18 is directed into a Fabry-Perot interferometer 20 whose optical transmission is a very strong function of wavelength. As is known the spacing between the Fabry-Perot interferometer surfaces is usually very large compared to the wavelength of light and therefore very high order standing waves are generated within the interferometer. Consequently a very small change in wavelength is responsible for a significant change in transmitted light intensity. The two mirrors of the interferometer are designated 20a and 20b, the latter being the movable mirror. The concentric ring fringe pattern output from the properly adjusted Fabry-Perot interferometer is then imaged through a lens 22 onto a pin hole 24. For maximum sensitivity the pin hole is adjusted to look at the center ring of the Fabry-Perot pattern. Behind the pin hole is a very sensitive light detector 25 which converts the transmitted light signal into an electrical signal.

One very satisfactory form of photo-detector is a refrigerated photomultiplier whose dark current is reduced by orders of magnitude through the cooling of the photomultiplier. At the same time the Johnson noise of the photomultiplier is significantly reduced. In this way, with the use of the Fabry-Perot interferometer and the refrigerated photomultiplier, a change of radiation wavelength is converted into a change in the optical pattern transmitted through the Fabry-Perot interferometer and is converted by means of the photomultiplier 25 into an electrical signal which is a measure of the wavelength change.

One problem with the portion of the embodiment so far described is that the electrical signal from the photomultiplier 25 can change due to changes in the intensity of the light from the plasma which is incident on the measuring system. This sensitivity to light intensity changes makes the system potentially sensitive to amplitude fluctuations. To prevent this potential source of difficulty in accordance with the present invention, a modulation oscillator 30 is included. Its output is fed to a power amplifier 32 through an amplifier 34. It is the electrical output of power amplifier 32 which electrically moves the mirror 20b, thereby sweeping the interferometer periodically around the spectral line. Thus, the output of the photomultiplier rather than being a direct-current (D.C.) signal is an alternating current (A.C.) signal. It can be used to separate changes of signal output due to wavelength changes from signal output changes due to amplitude changes. Basically, signal output changes due to amplitude changes will be reflected only as changes in amplitudes, while changes in signal output due to wavelength changes will be reflected as changes in phase.

The presence of the modulation oscillator 30 enables the incorporation of a feedback stabilization lag in the system in order to permit the resonance of the interferometer to be locked into resonance with the spectral line. In this way the system is converted into a wavelength discriminator which is relatively independent of light amplitude modulation.

As shown in FIG. 1, the feedback stabilization loop includes a phase sensitive detector 40 which is fed with the photomultiplier output and which uses the oscillator output as a reference signal. The phase sensitive detector is operated in the quadrature mode so that its output is zero when the center of the interferometer's resonance corresponds to the center of the line. When the line center deviates in one direction (e.g. towards shorter wavelength) the discriminator's output is of one polarity and is of an opposite polarity when the line center deviates in the other direction. When the resonance of the interferometer corresponds to the center of the line, the output of the phase detector is essentially zero. It remains zero even though the amplitude of the signal from the photomultiplier changes, for example, due to light amplitude changes.

As shown in FIG. 1, the output of the phase detector 40 is amplified by a feedback amplifier 42 whose output is summed up at a junction point 43 with the oscillator output. As shown, the output signal of amplifier 42 passes through a feedback loop gain control variable resistor 44, a mode control switch 46 and a resistor 45. When the line is off resonance there is an error signal represented by the D.C. output of the detector 40. The amplitude of this error signal depends on the amplitude of the light intensity. However, since the feedback loop constantly drives this error signal toward zero, a change in light amplitude causes relatively little difficulty in acquiring and tracking the center of the spectral line.

Figure 2:
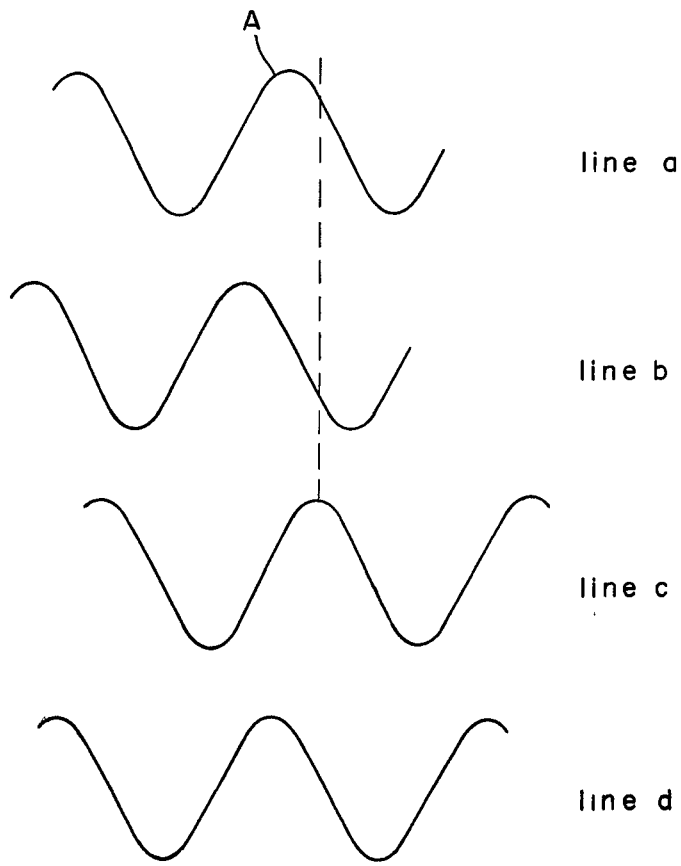
FIG. 2 is a waveform diagram useful in explaining the invention.

This aspect of the invention may be better understood by referring to FIG. 2 wherein line a represents the output of the photomultiplier 25. Point A represents lock on the center of the spectral line. Lines b, c, and d represent three different outputs of the oscillator. It should be appreciated that if the output of the oscillator is as shown in line b, this output can be thought of as leading the photomultiplier output. Thus, the detector would provide a D.C. signal of a one polarity. On the other hand if the oscillator output is as shown in line c, it lags that of the photomultiplier output. Thus, the detector's output would be of the opposite polarity. Only when the oscillator output is in phase with that of the photomultiplier, as shown by line d, is the detector's output substantially zero.

It should be pointed out that in practice the output is never zero but rather very small. Its polarity is an indication of the direction of wavelength change and its magnitude a measure of the actual wavelength change. It should further be pointed out that since the feedback drives the error to substantially zero, one operates about the peaks of the waveform in line a. Consequently, any error due to changes in the amplitude of this waveform due to changes in the light intensity is reduced very significantly.

The gain of the feedback loop is controlled by the gain of the operational feedback amplifier 42 and the setting of resistor 44. Too high a loop gain may drive the system into hunting around the center of the line. As shown, the feedback control signal is fed into the summing position 43 where it is summed with the oscillator output and fed to amplifier 34.

As shown in FIG. 1, the system further includes a zero adjust potentiometer 50, shown for example, connected at its ends to positive and negative sources e.g. +15V and −15V. Its function is to provide a potential to drive the interferometer into the vicinity of resonance so that the feedback loop can provide the remaining signal to complete the line center acquisition. In practice, switch 45 is placed in the unlocked mode position, thereby opening the feedback loop. Then the zero adjust is used to null the output of the phase sensitive detector. Thereafter, switch 45 is switched to the locked mode position to close the feedback loop. The output of amplifier 34 is then used to drive power amplifier 32 which in turn drives mirror 20b. Either magnetic coil drive or a piezo-electric drive may be employed.

The system has to be calibrated in order to obtain a relationship between the feedback corrective signal which is applied to position 43 and which is directly related to the output signal of detector 40 and the corresponding change of the spectral line. This can be accomplished by opening the feedback loop and feeding to position 43 the output of a sweep generator 52 through a switch 53. The generator 52 provides a ramp-shaped voltage thereby scanning the interferometer with a slow linear sweep. For calibration purposes, it is preferred to use a light source with known doublet spectral lines such as sodium or mercury. Thus, the known wavelength difference between them can be converted into a voltage range within the linear sweep. In this way, the feedback voltage applied to the summing junction is calibrated in terms of corresponding Angstroms.

The above-described system can also be used to measure line width and shape of radiation from various ions and atoms. For such purposes, the feedback loop is opened and the output of the phase detector is measured as a function of the slow sweep voltage from the sweep generator 52. Since the sweep voltage has been calibrated in terms of corresponding Angstroms, the scan of the line shape can be traced out, at least as it is modified by the modulation. There will be a certain amount of instrumentation broadening and the output will correspond to the derivative of the line shape with respect to wavelength rather than to the actual line shape. Numerical or analog integration of the output of the phase detector will yield the line shape itself.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A particle velocity measuring system comprising:
   an interferometer means including a movable element for providing a fringe pattern as a function of the wavelength of light directed thereto and the position of said element;
   a photomultiplier;
   means for directing said fringe pattern to said photomultiplier whose output is a function of the pattern directed thereto;
   light directing means for selectively successively directing light to said interferometer from light-radiating moving particles in a direction perpendicular to their velocity direction and from a direction other than perpendicular to their velocity direction; and
   means for controlling the movement of said movable element as a function of at least the output of said photomultiplier.

2. A system as recited in claim 1 further including optical filter means disposed between said light directing means and said interferometer for selecting a particular wavelength range of light from said particles which is directed to said interferometer.

3. A system as recited in claim 1 further including modulating means including an oscillator for controlling said movable mirror to sweep about a preselected position.

4. A system as recited in claim 3 further including phase sensitive detector means responsive to the outputs of said photomultiplier and said oscillator for providing a control signal, and feedback means for combining said control signal with the output of said oscillator to control the sweep of said movable element.

5. A system as recited in claim 4 further including, optical filter means disposed between said light directing means and said interferometer for selecting a particular wavelength range of light from said particles which is directed to said interferometer.

6. A system as recited in claim 4 wherein said light density means including a first light pipe for passing light in a direction perpendicular to the velocity direction of said particles and at least a second light pipe for passing light from a direction other than perpendicular to the velocity direction of said particles.

* * * * *